United States Patent Office 3,440,291
Patented Apr. 22, 1969

3,440,291
SINGLE-STAGE HYDROFORMYLATION OF OLEFINS TO ALCOHOLS
John L. Van Winkle, San Lorenzo, Rupert C. Morris, Berkeley, and Ronald F. Mason, Mill Valley, Calif., assignors to Shell Oil Company, New York, N.Y., a corporation of Delaware
No Drawing. Continuation-in-part of application Ser. No. 468,573, June 30, 1965. This application Oct. 6, 1965, Ser. No. 493,555
The portion of the term of the patent subsequent to Jan. 7, 1986, has been disclaimed
Int. Cl. C07c 29/16
U.S. Cl. 260—632                9 Claims

ABSTRACT OF THE DISCLOSURE

The direct, single-stage production of reaction products consisting predominantly of primary alcohol by reacting an olefinic compound with carbon monoxide and hydrogen at a temperature between about 100° and 300° C. and superatmospheric pressure in the presence of a catalyst of cobalt in complex combination with carbon monoxide and a P-hydrocarbyl monophosphabicyclononatriene.

---

This application is a continuation-in-part of copending U.S. application Ser. No. 468,573, filed June 30, 1965.

In that application is described in hydroformylation process to effect the direct, single-stage hydroformylation of olefins to reaction products consisting predominantly of primary alcohols, utilizing substantially lower pressures and a cobalt catalyst comprising cobalt in complex formation with carbon monoxide and a phosphorus-containing ligand consisting essentially of a bicyclic heterocyclic tert-phosphine. Generically, those compounds are hydrocarbyl - substituted monophosphabicyclohydrocarbons, saturated or unsaturated, of 8 to 9 atoms in which the smallest phosphorus-containing ring contains at least 5 atoms, and the phosphorus atom therein is a member of a bridge linkage but is not a bridgehead atom.

Certain of the aforesaid ligands now have been found to be particularly useful and advantageously obtainable from readily available materials. These are bicyclic heterocyclic tert-phosphine ligands in which the bicyclic portion of the molecule is unsaturated, and more particularly, they are the hydrocarbyl-substituted monophosphabicyclononatrienes.

It is therefore an object of the present invention to provide novel catalysts obtainable from readily available materials for use in an improved hydroformylation process to effect the direct, single-stage hydroformylation of olefins to produce reaction products consisting predominantly of primary alcohols.

In accordance with the present invention, olefinic compounds are converted to primary alcohols having one more carbon atom than the olefinic compounds by reacting the olefinic compounds in liquid phase, with carbon monoxide and hydrogen, at a temperature between about 100° and about 300° C., in the presence of a novel catalyst comprising cobalt in complex combination with carbon monoxide and a particular class of unsaturated bicyclic heterocyclic tert-phosphines.

The specific class of unsaturated bicyclic heterocyclic tert-phosphine, which is a suitable ligand of the novel cobalt-containing catalysts of the present invention, is a hydrocarbyl-substituted monophosphabicyclononatriene. A particularly useful group of such phosphines includes hydrocarbyl-substituted monophosphabicyclononatrienes having from 9 to 44 carbon atoms, preferably from 12 to 38, and which is represented by the formula

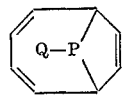

wherein Q represents hydrocarbyl.

The term "hydrocarbyl" is used in its accepted meaning as representing a radical formed from a hydrocarbon by removal of a hydrogen atom. The hydrocarbyl groups represented by Q in the formula above may be any nonacetylenic organic radical composed solely of carbon and hydrogen. The widest variation is possible in that the (nonactylenic) hydrocarbyl group may be alkyl, alkenyl, cycloalkyl, cycloalkenyl, aryl, aralkyl, alkaryl, single ring, multi-ring, straight chain, branched chain, large or small. Representative hydrocarbyl groups include methyl, ethyl, methallyl, n-butyl, hexyl, hexenyl, isooctyl, dodecyl, oleyl, octadecyl, eicosyl, hexacosyl, octacosyl, triacontyl, hexatriacontyl, tetracontyl, cyclohexyl, cyclooctyl, cyclooctenyl, phenyl, naphthyl, benzyl, styryl, phenethyl, and the like. Thus, a particularly useful class of hydrocarbyl-substituted monophosphabicyclononatrienes is that containing only carbon, hydrogen, and phosphorus atoms.

Substituted hydrocarbyl groups are also operable and may contain a functional group such as the carbonyl, carboxyl, nitro, amino, hydroxy (e.g. hydroxyethyl), cyano, sulfonyl, and sulfoxyl groups. A particularly useful group of ligands consists of those in which Q is hydrocarbyl of from 1 to 36 carbon atoms; especially preferred are those in which Q is hydrocarbyl of from 4 to 30 carbons.

Hence, a preferred group of P-hydrocarbyl monophosphabicyclononatrienes includes those represented by the formula

(II)

where Q represents hydrocarbyl of 1 to 36 carbons and especially of 4 to 30.

The monophosphabicyclononatrienes in which the phosphorus atom is substituted with hydrocarbyl are particularly advantageous and valuable because they may be prepared from readily available materials. They may be produced by the reaction of a di(alkali metal) salt of a suitable cyclic tetraolefinic compound with hydrocarbylphosphonous dihalides, especially dichlorides, which are readily available. For example, 9-hydrocarbyl-9-phosphabicyclononatrienes, in which the smallest phosphorus-containing ring contains at least 5 atoms, are derived from di(alkali metal) salts of cyclooctatetraene, which in turn are obtainable by the low-temperature reaction of cyclooctatetraene with an alkali metal, especially potassium, lithium, or sodium and preferably potassium. Cyclooctatetraene is readily available from the cyclotetramerization of acetylene. The aforesaid di(alkali metal) salt is then reacted with a hydrocarbylphosphonous dihalide, preferably a dichloride. This reaction step may often proceed with violence; therefore, low temperatures are recommended. Both steps are conveniently carried out in a dry solvent inert to reaction with alkali metal. Suitable solvents include ethers such as tetrahydrofuran, dioxane, and the like. The P-hydrocarbyl monophosphabicyclononatrienes may be recovered from the solvent by conventional methods, e.g. distillation, filtration, sublimation, and the like. By way of illustration, 22.3 g. of potassium cut into small portions was added to 250 ml. of tetrahydrofuran, dried by previous distillation from LiAlH₄. This mixture was cooled to −75° C. and to it, over a period of ½ hour, was added dropwise 26 g. of cyclooctatetraene. The resulting material was stirred at −72° C. for 4 hours. The temperature was raised to −16° C. and held there for 10 hours during which time yellow crystals formed. The slurry was diluted with 250 ml. of dry tetrahydrofuran and filtered through a glass wool plug to remove unreacted potassium into a dropping funnel. The above operations were conducted under N₂. In a reaction kettle was placed 0.27 mole of phenylphosphonous dichloride diluted with 100 ml. of dry tetrahydrofuran. The contents of the kettle were cooled to −20° C. and the solution of the di(potassium) salt of cyclooctatetraene was added dropwise over 1 hour thereto. The resulting reaction mixture was allowed to warm to room temperature and stirred for 6 hours. To this was added 300 ml. of butanol, followed by 300 ml. of ether saturated with water and 500 ml. of water. The mixture was stirred for 1 hour and then the organic layer was separated therefrom. The organic layer was evaporated to dryness and the remaining solid mass was sublimed at 0.3 mm. Hg and 150° C. to produce 8.5 g. of 9-phenyl-9-phosphabicyclo[4.2.1]nona-2,4,7-triene, a white crystalline solid.

Suitable and novel catalysts of the invention include the tertiary organophosphine-cobalt-carbonyl complexes represented by the empirical formula $$[I_m Co(CO)_n]_x \quad \text{(III)}$$

wherein I is the aforedescribed monophosphabicyclononatriene containing the member Q, m and n represent positive integers, each having a value of at least 1 and whose sum is 4, and x represents a positive integer from 1 to 3. Preferred catalysts of the above-defined class comprise those wherein Q represents hydrocarbyl containing from 1 to 36 carbon atoms. A particularly preferred group of catalysts within the above-defined class are the P-hydrocarbyl monophosphabicyclononatriene-cobalt - carbonyl complexes wherein the number of carbons in the Q member of the monophosphabicyclononatriene I is from 4 to 30.

It is to be understood that the suitable novel catalysts identified by the foregoing empirical Formula III may comprise two different I ligands and even two or more of the $I_m Co(CO)_n$ groups. For example, in the suitable catalysts the novel complex between cobalt, carbon monoxide, and phosphine ligand may be monomeric in structure or may be composed of several monomeric units. Thus, the novel complex may be present as a dimer, e.g., a bis(phosphine) dicobalt hexacarbonyl.

It will be apparent from the preceding discussion that a variety of P-hydrocarbyl monophosphabicyclononatriene ligands may be used in the novel catalysts of the invention. In the nomenclature of such compounds, conventional numbering of the ring systems has been employed, as further illustrated by the following formula:

(IV)

Representative examples of suitable catalysts of the above-defined class comprise novel complexes between cobalt, carbon monoxide, and one or a mixture of the following phosphine groups, numbered according to the aforesaid system, especially as the bis(phosphine) dicobalt hexacarbonyl: 9-hydrocarbyl-9-phosphabicyclononatriene in which the smallest P-containing ring contains at least 5 atoms; 9-hydrocarbyl - 9-phosphabicyclo[4.2.1]nona-2,4,7-triene; 9-aryl-9-phosphabicyclo[4.2.1]nona - 2,4,7-triene, such as 9-phenyl-9-phosphabicyclo[4.2.1]nona-2,4,7-triene; 9-alkyl-9 - phosphabicyclo[4.2.1]nona - 2,4,7-triene, such as 9-octadecyl-9-phosphabicyclo[4.2.1]nona - 2, 4,7-triene, 9-hexyl-9-phosphabicyclo[4.2.1]nona - 2,4,7-triene, 9 - eicosyl-9-phosphabicyclo[4.2.1]nona-2,4,7-triene, and 9-triacontyl - 9 - phosphabicyclo[4.2.1]nona-2,4,7-triene; 9-cycloalkyl - 9-phosphabicyclo[4.2.1]nona-2,4,7-triene, such as 9-cyclohexyl - 9-phosphabicyclo[4.2.1]nona-2,4,7-triene; and the like.

Of these catalysts, those in which the tert-phosphine is 9-alkyl-9-phosphabicyclo[4.2.1]nona - 2,4,7 - triene or 9-aryl-9-phosphabicyclo[4.2.1]nona - 2,4,7-triene are somewhat preferred. A particularly preferred catalyst comprises cobalt-tricarbonyl - 9-phenyl - 9 - phosphabicyclo[4.2.1] nona-2,4,7-triene, believed to be dimeric

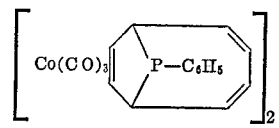

The novel catalysts can be prepared by a diversity of methods described in copending U.S. application Ser. No. 468,573, filed June 30, 1965. The pertinent portions of Ser. No. 468,573 are incorporated in and made a part of this specification for the purpose of describing these methods in more detail. X-ray analyses show the crystalline form of the catalyst complex to be a dimer with a linear P—Co—Co—P group in the molecule. For example, bis (9-phenyl - 9 - phosphabicyclo[4.2.1]nona - 2,4,7 - triene) dicobalt hexacarbonyl is a red-brown-colored crystalline solid, exhibiting a strong carbonyl absorption band at a wave number of 1957 cm.⁻¹.

In accordance with the invention, olefinic compounds are hydroformylated to reaction products predominating in primary alcohols by intimately contacting the olefinic compound in liquid phase with carbon monoxide and hydrogen in the presence of the above-defined catalysts comprising a complex of cobalt with certain phosphine ligands and carbon monoxide at well defined conditions of temperature and pressure which are described in the abovementioned copending U.S. application. The pertinent portions of Ser. No. 468,573 are incorporated in and made a part of this specification for the purpose of describing these conditions in more detail.

The ratio of catalyst to the olefin to be hydroformylated is generally not critical and may vary widely. The ratio of hydrogen to carbon monoxide charged may vary widely. These ratios are described in detail in the aforementioned copending U.S. application and the pertinent portions thereof are incorporated in and made a part of this specification for the purpose of describing these ratios in more detail.

A single advantage of the present invention as indicated above and further evidenced by the following examples is the ability to effect the direct, single-stage hydroformylation of the olefins to a reaction mixture wherein primary alcohols predominate over the aldehydes and byproduct saturated hydrocarbons. The alcohols obtained from the starting olefins are furthermore generally primarily the straight chain or normal isomers. The various olefinic materials having at least one ethylenic carbon-to-carbon bond and hydroformylated according to the process of this invention are described in detail in the aforementioned copending U.S. application. The pertinent portions of Ser. No. 468, 573 are incorporated in and made a part of this specification for the purpose of describing these materials in more detail.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, may be recycled in part or entirely to the reaction zone.

The following examples are illustrative of the process of this invention. It is to be understood that these examples are given only for illustration and are not to be construed as limiting the invention to the details thereof.

EXAMPLES 1 AND 2

Cobalt catalysts of cobalt in complex combination with carbon monoxide and the below-indicated tertiary phosphine ligands were utilized with 1-dodecene as olefin. The catalysts were prepared in situ, in the equipment to be described, from cobalt octanoate.

The reactor was a 300-ml. stainless steel magnetically stirred autoclave operated at 1250 r.p.m. and connected to a source of a premixed hydrogen-carbon monoxide gas delivered at any desired constant pressure. The components forming the catalyst (e.g., tertiary phosphine and cobalt octanoate) and the olefin, 1-dodecene, were charged to the reactor; the reactor was closed, evacuated, and pressured with $H_2/CO$ gas until all foreign gases were displaced. The reactor was then heated under sufficient $H_2+CO$ pressure so that the final pressure at reaction temperature was about 1000 p.s.i.g. After the temperature was equilibrated, the pressure reduction was recorded. The reaction conditions and results are tabulated in Table 1.

Example 1 below, utilizing the commercially available tri-n-butylphosphine as the phosphorus ligand, was taken as a comparative control. A comparison between Example 1 and Example 2 shows that the quantity of undesirable saturated hydrocarbon by-product formed when using as ligand the hydrocarbyl-substituted monophosphabicyclononatriene of the invention is less by a factor of about one-half that that formed when using tri-n-butylphosphine, in spite of the fact that the hydrogenating activity of the novel catalyst in Example 2 was sufficient to ensure essentially complete hydrogenation of the intermediate aldehyde.

TABLE 1.—HYDROFORMYLATION OF 1-DODECENE

| Example | 1 | 2 |
|---|---|---|
| Phosphine ligand | (¹) | (²) |
| Cobalt, percent wt | 0.2 | 0.2 |
| Phosphine/cobalt mole ratio | 2 | 2 |
| $H_2/CO$ mole ratio | 2.1 | 2.1 |
| Temperature, °C | 198–202 | 198–200 |
| Pressure, p.s.i.g | 1,000 | 1,200 |
| Time required for 99% conversion, hr | 3.6 | 1.5 |
| Conversion of 1-dodecen, percent | 99.1 | 98.6 |
| Conversion to saturated hydrocarbon, percent | 20.4 | 9.6 |
| Conversion to primary alkanols, percent | 78.2 | 88.6 |

¹ Tri-n-butyl phosphine.
² 9-phenyl-9-phosphabicyclo-[4.2.1]nona-2,4,7-triene.

EXAMPLE 3

1-dodecene was hydroformylated in the manner described in the previous examples by reaction with carbon monoxide and hydrogen in a $H_2/CO$ mole ratio of 2:1, at 198–203° C., a pressure of 1000 p.s.i.g., with a contact time of 3 hours in the presence of a catalyst consisting of triphenylphosphine-cobalt-carbonyl at a phosphine/cobalt mole ratio of 2:1. There was obtained a conversion of 98.8% of the olefin with a selectivity to $C_{13}$ alcohols of 86.1%. Of the $C_{13}$ alcohols obtained, 52% was the linear, straight-chain n-tridecanol, the remainder branched-chain alcohols.

Similarly 1-dodecene was hydroformylated by reaction with carbon monoxide and hydrogen in a $H_2/CO$ mole ratio of 2:1, at 200° C., a pressure of 1200 p.s.i.g., with a contact time of 1.3 hours in the presence of a novel catalyst consisting of 9-phenyl-9-phosphabicyclo[4.2.1]-nona-2,4,7-triene-cobalt-carbonyl at a phosphine/cobalt mole ratio of 1.5:1. There was obtained a conversion of the olefin of 98.6% with a selectivity to $C_{13}$ alcohols of 88.6%. Of the $C_{13}$ alcohols obtained, 68% was the linear, straight-chain n-tridecanol, the remainder branched-chain alcohols.

It is seen from the foregoing results that with triphenylphosphine as the phosphorus ligand of the catalyst the predominance of the highly desirable linear straight-chain or normal alcohol over the branched-chain isomers is not so great as with novel catalyst in which the phosphorous ligand is the P-hydrocarbyl monophosphabicyclononatriene of the invention.

EXAMPLE 4

1-dodecene was hydroformylated in the manner described in the previous examples with the addition that alkali was added in a KOH/cobalt mole ratio of 0.75:1, by reaction with carbon monoxide and hydrogen in a $H_2/CO$ mole ratio of 2:1, at 200–203° C., a pressure of 1000 p.s.i.g., with a contact time of 5.5 hours in the presence of a catalyst consisting of trilaurylphosphine-cobalt-carbonyl at a phosphine/cobalt mole ratio of 1.5:1, there was obtained a conversion of 99.2% of the olefin with a conversion to primary $C_{13}$ alcohols of 83.2%.

Similarly 1-dodecene was hydroformylated at 175° C. with a contact time of five hours at a pressure of 1200 p.s.i.g. in the presence of a novel catalyst consisting of 9-phenyl-9-phosphabicyclo[4.2.1]nona-2,4,7-triene-cobalt-carbonyl. There was obtained a conversion of 98.6% of the olefin with a conversion to primary $C_{13}$ alcohols of 88.6%.

The foregoing results of obtaining a similar conversion at about the same contact time but at approximately 25° C. lower temperature demonstrate the exceptionally rapid rate of hydroformylation achieved by the new and improved hydroformylation catalyst in which the phosphorus ligands are the hydrocarbyl-substituted monophosphabicyclononatrienes of the invention as compared with the rate achieved when a trialkylphosphine such as trilaurylphosphine is the phosphorus ligand of the catalyst.

A further economic advantage obtainable with the catalysts of the present invention is that, in continuous hydroformylation processing, longer catalyst life is achieved by virtue of the ability to hydroformylate at lower temperatures. Additionally, these catalysts are more stable during the hydroformylation process owing to the fact that their resistance to oxidation and degradation is higher than that of catalysts having a trialkylphosphine ligand.

We claim as our invention:
1. The process for the direct, single-stage production of reaction products consisting predominantly of primary alkanol which comprises reacting a monoolefinic hydrocarbon with carbon monoxide and hydrogen at a temperature between about 100° and 300° C. and superatmospheric pressure in the presence of a catalyst consisting essentially of cobalt in complex combination with carbon monoxide and a hydrocarbyl-substituted monophosphabicyclononatriene of the formula

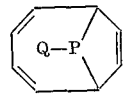

where Q represents hydrocarbyl of from 1 to 36 carbon atoms.

2. The process in acordance with claim 1 wherein said pressure is between about 1 atmosphere and 2000 p.s.i.g.

3. The process in accordance with claim 2 wherein said monoolefinic hydrocarbon reacted is one having from 4 to 19 carbon atoms to the molecule and said Q represents hydrocarbyl of from 4 to 30 carbon atoms.

4. The process in accordance with claim 3 wherein said monoolefinic hydrocarbon has from 7 to 9 carbon atoms to the molecule.

5. The process in accordance with claim 3 wherein said monoolefinic hydrocarbon has from 10 to 13 carbon atoms to the molecule.

6. The process in accordance with claim 3 wherein said monoolefinic hydrocarbon has from 14 to 17 carbon atoms to the molecule.

7. The process in accordance with claim 3 wherein said monophosphabicyclononatriene is 9 - eicosyl - 9 - phosphabicyclo[4.2.1]nona-2,4,7-triene.

8. The process in accordance with claim 3 wherein said monophosphabicyclononatriene is 9 - phenyl - 9 - phosphabicyclo[4.2.1]nona-2,4,7-triene.

9. The process in accordance with claim 3 wherein said reaction products consist predominantly of straight chain terminal alkanol having from 5 to 20 carbon atoms to the molecule, said monoolefinic hydrocarbon reacted is a straight chain internal monoolefin, and said pressure is between about 400 and 1200 p.s.i.g.

References Cited

UNITED STATES PATENTS

| | | |
|---|---|---|
| 2,564,130 | 9/1951 | Schreyer. |
| 3,102,899 | 9/1963 | Cannell. |
| 3,239,569 | 3/1966 | Slaugh et al. |
| 3,310,576 | 3/1967 | Mertzweiller et al. ____ 260—439 |

OTHER REFERENCES

Hatch: "Higher Axo Alcohols," 1957, pp. 6–19.
Maier: "Progress in Inorganic Chemistry," vol. 5 (1963), pp. 155–166 and 178.

LEON ZITVER, *Primary Examiner.*

J. E. EVANS, *Assistant Examiner.*

U.S. Cl. X.R.

260—439, 604, 606.5, 638, 665, 666